(12) United States Patent
Samejima et al.

(10) Patent No.: US 6,578,656 B2
(45) Date of Patent: Jun. 17, 2003

(54) RIDING MOWER

(75) Inventors: Kazuo Samejima, Kaizuka (JP);
Hironori Tsuchihashi, Wakayama (JP);
Yoshikazu Togoshi, Osaka (JP);
Yoshihiro Kawahara, Sakai (JP);
Teruo Shimamura, Nishinomiya (JP);
Osami Fujiwara, Kishiwada (JP);
Yoshiyuki Esaki, Sakai (JP)

(73) Assignee: Kubota Corporation (JP)

( * ) Notice: Subject to any disclaimer, the term of this patent is extended or adjusted under 35 U.S.C. 154(b) by 0 days.

(21) Appl. No.: 09/389,790

(22) Filed: Sep. 3, 1999

(65) Prior Publication Data

US 2003/0062212 A1 Apr. 3, 2003

(30) Foreign Application Priority Data

Sep. 3, 1998 (JP) .......................... 10-248987
Mar. 23, 1999 (JP) .......................... 11-078023

(51) Int. Cl.$^7$ .......................... B60K 17/356
(52) U.S. Cl. .................... 180/291; 180/308
(58) Field of Search .................. 180/54.1, 6.2, 180/6.3, 6.32, 291, 292, 68.4, 68.6, 908, 305, 307–308

(56) References Cited

U.S. PATENT DOCUMENTS

| 2,876,657 | A | * | 3/1959 | Allin, Sr. et al. ............ 180/6.2 |
| 3,612,199 | A | * | 10/1971 | Vissers ....................... 180/6.32 |
| 3,662,849 | A | * | 5/1972 | Bostad et al. ................ 180/908 |
| 4,738,328 | A | * | 4/1988 | Hayden ....................... 180/307 |
| 5,218,814 | A | * | 6/1993 | Teal et al. .................... 180/291 |
| 5,228,530 | A | * | 7/1993 | Tsuchihashi ............... 180/68.4 |
| 5,496,226 | A | * | 3/1996 | Splittstoesser et al. ....... 180/6.2 |
| 6,056,074 | A | * | 5/2000 | Heal et al. .................... 180/6.2 |
| 6,105,349 | A | * | 8/2000 | Busboom et al. .......... 180/68.6 |
| 6,196,348 | B1 | * | 3/2001 | Yano et al. .................. 180/305 |

FOREIGN PATENT DOCUMENTS

| JP | 63-145178 | * | 6/1988 | .................. 180/308 |
| JP | 63-279975 | * | 11/1988 | .................. 180/6.32 |
| JP | 2-120132 | * | 5/1990 | .................. 180/291 |
| SU | 1402444 | * | 6/1988 | .................. 180/308 |

* cited by examiner

Primary Examiner—Frank Vanaman
(74) Attorney, Agent, or Firm—Webb Ziesenhiem Logsdon Orken & Hanson, P.C.

(57) ABSTRACT

A riding mower includes a pair of right and left propelling wheels, an engine disposed rearwardly of axles of the propelling wheels, a pair of right and left transmission cases corresponding to the propelling wheels and supporting the propelling wheels, respectively, a pair of right and left HSTs coupled to the transmission cases for outputting power thereto, respectively, a center case housing a power distributor for transmitting power from the engine to the pair of right and left HSTs, and a mower unit disposed forwardly of the propelling wheels. The center case is disposed forwardly of the axles of the propelling wheels.

14 Claims, 13 Drawing Sheets

RIDING MOWER

BACKGROUND OF THE INVENTION

1. Field of the Invention

This invention relates to an improvement in a riding mower having a mower unit disposed forwardly of propelling wheels.

2. Description of the Related Art

A riding mower of this type is disclosed in U.S. Pat. No. 4,809,796, for example. This known mower includes a pair of right and left rear drive wheels (i.e. propelling wheels), a pair of right and left driven dirigible front wheels, and a mower unit disposed between the rear wheels and front wheels. Each of the right and left rear wheels has an HST, and the front wheels are steered by a speed difference between the right and left rear wheels. The mower can make an in situ turn by driving the right and left rear wheels in opposite directions. Thus, the mower has excellent small turn performance.

According to the prior art noted above, an engine is disposed substantially right over the rear wheels. A driver's seat is disposed between the front wheels and rear wheels and forwardly of the engine. This construction has an advantage of allowing main components of the mower to be arranged en bloc between the front wheels and rear wheels. However, since the driver's seat is disposed forwardly of and relatively far from the rear wheels, the driver tends to be swung around when the mower makes a very small turn such as an in situ turn. There is room for improvement in this respect.

SUMMARY OF THE INVENTION

The object of this invention is to provide a riding mower which overcomes the disadvantage noted above.

The above object is fulfilled, according to this invention, by a riding mower comprising a pair of right and left propelling wheels, and an engine for driving the propelling wheels. The engine is disposed rearwardly of axles of the propelling wheels. The mower further comprises a pair of right and left transmission cases corresponding to the propelling wheels and supporting the propelling wheels, respectively, a pair of right and left HSTs coupled to the transmission cases for outputting power thereto, respectively, and a center case for transmitting power from the engine to the pair of right and left HSTs. The center case is disposed forwardly of the axles of the propelling wheels. A mower unit is disposed forwardly of the propelling wheels.

With the above construction, the mower according to this invention has the engine disposed in a further rearward position than in the prior art, and the driver's seat may be disposed close to the propelling wheels in the running direction. Consequently, the tendency of the driver being swung around in time of a sharp turn such as an in situ turn is reduced since the driver may be seated close to the turning axis.

Further, this riding mower has the center of gravity located near the propelling wheels to realize improved turning performance and spin turn performance.

DETAILED DESCRIPTION OF THE PREFERRED EMBODIMENT

An embodiment of this invention will be described hereinafter with reference to the drawings.

Figure 1:
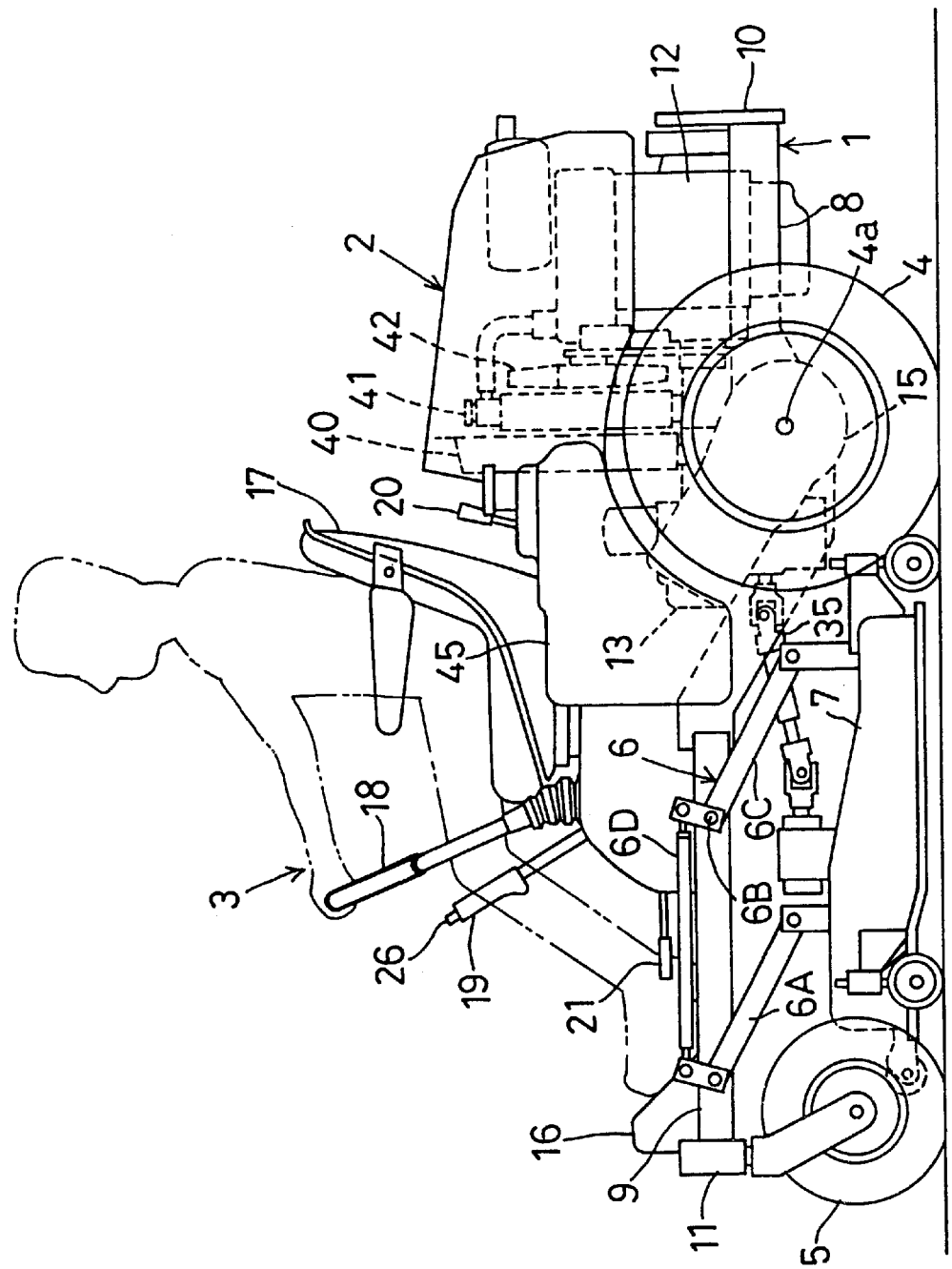
FIG. 1 is a side elevation of a riding mower according to this invention.

FIG. 1 shows a side elevation of a riding mower.

This mower includes a body frame 1, a motor section 2 disposed on a rear portion of body frame 1, a driving platform 3 formed on a forward portion of body frame 1, a pair of right and left propelling wheels 4 arranged at rear portions of body frame 1. front wheels 5 acting as auxiliary wheels attached to right and left positions at forward ends of body frame 1 to be swivellable on vertical axes following movement of the mower, and a mower unit 7 suspended from the body frame 1 through a link mechanism 6 between propelling wheels 4 and front wheels 5. Thus, this riding mower is the mid-mount type.

Each of the right and left propelling wheels 4 is rotatably supported through a corresponding axle 4a.

Figure 2:
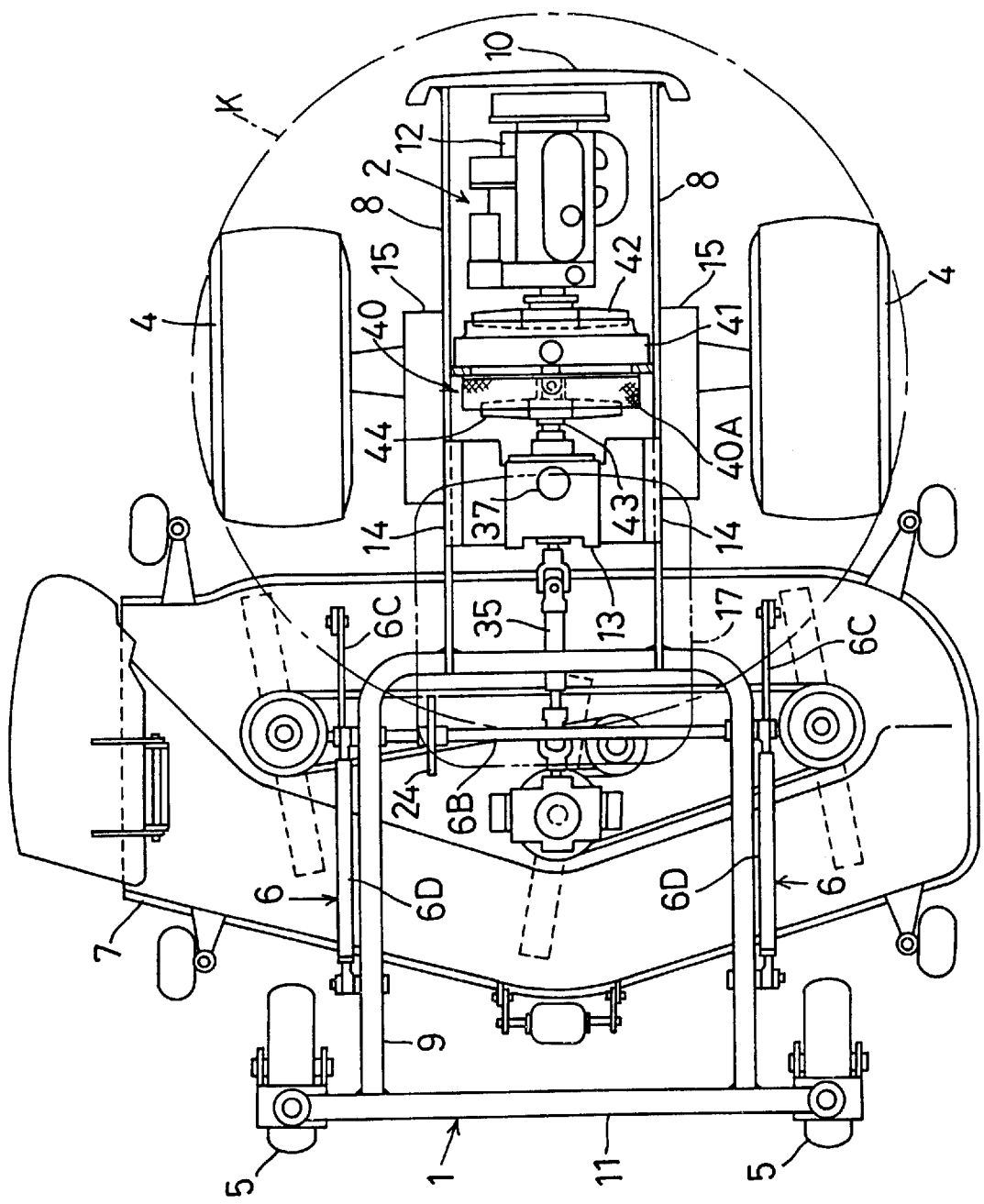
FIG. 2 is a plan view showing the construction of the riding mower.

As also shown in FIG. 2, the body frame 1 includes a pair of right and left rear frames 8 extending longitudinally of the mower, with a predetermined transverse spacing therebetween, a U-shaped front frame 9 interconnecting forward ends of the rear frames 8 and having opposite ends extending forward, a first connecting frame 10 interconnecting rear ends of the rear frames 8, and a second connecting frame 11 interconnecting forward ends of the front frame 9.

As shown in FIGS. 1 through 5, the motor section 2 includes a water-cooled diesel engine 12 with a lower portion thereof disposed between rear portions of the right and left rear frames 8, a center case 13 housing a power distributor 13a disposed forwardly of the lower portion of engine 12, hydrostatic transmissions (HSTs) 14 acting as stepless change speed devices connected to opposite, right and left ends of power distributor 13a, and transmission cases 15 housing reduction gears 15A connected to the right and left HSTs 14, respectively. Power transmitted from the engine 12 through shafts is distributed right and left by the power distributor 13a. Each part of the power distributed is transmitted to the propelling wheel 4 through the HST 14 and reduction gears 15A. Thus, change speed operations may be performed for the right and left propelling wheels 4 independently of each other.

Each transmission case 15 extends longitudinally of the mower. Each HST 14 is connected to the transmission case 15 in a position forwardly of the axle 4a.

The center case 13, right and left HSTs 14 and transmission cases 15 are rigidly connected to one another. The center case 13 is disposed forwardly of the axles 4a.

Figure 5:
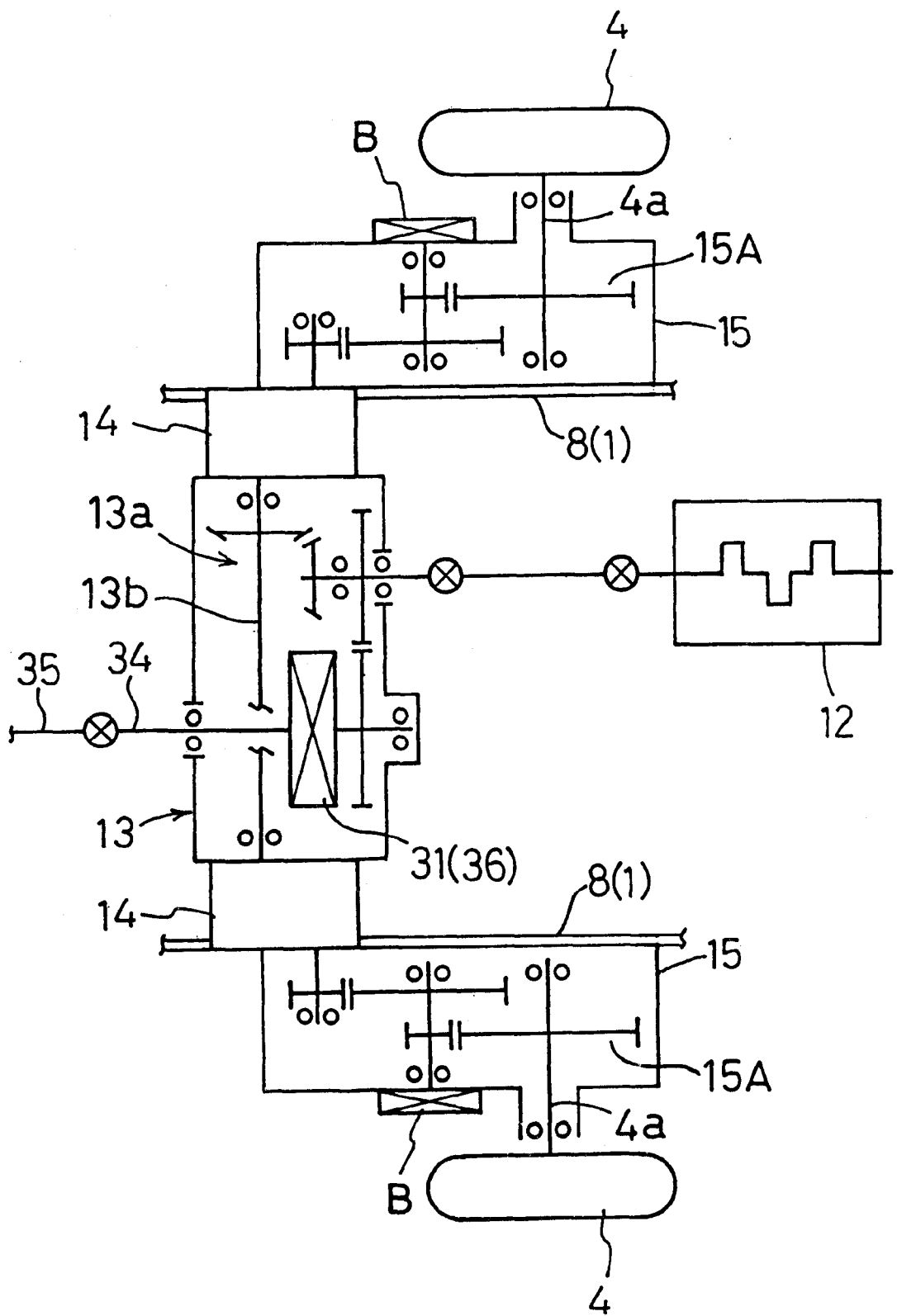
FIG. 5 is a schematic cross section of the motor section showing a transmission structure.

As shown in FIGS. 2 and 5, the right and left rear frames 8 are arranged inwardly of the right and left transmission cases 15 and fixed thereto with bolts. That is, an entire transmission system including the power distributor 13a and right and left HSTs 14 and right and left transmission cases 15 has a rigid integral structure which reinforces the right and left rear frames 8 acting as right and left frame portions of body frame 1 for supporting the mower unit 7 as suspended therefrom. As a result, a desirable frame structure is provided which has a sufficient strength for supporting the mower unit 7 in suspension, while achieving a simplified construction and lightening of the vehicle body.

Figure 3:
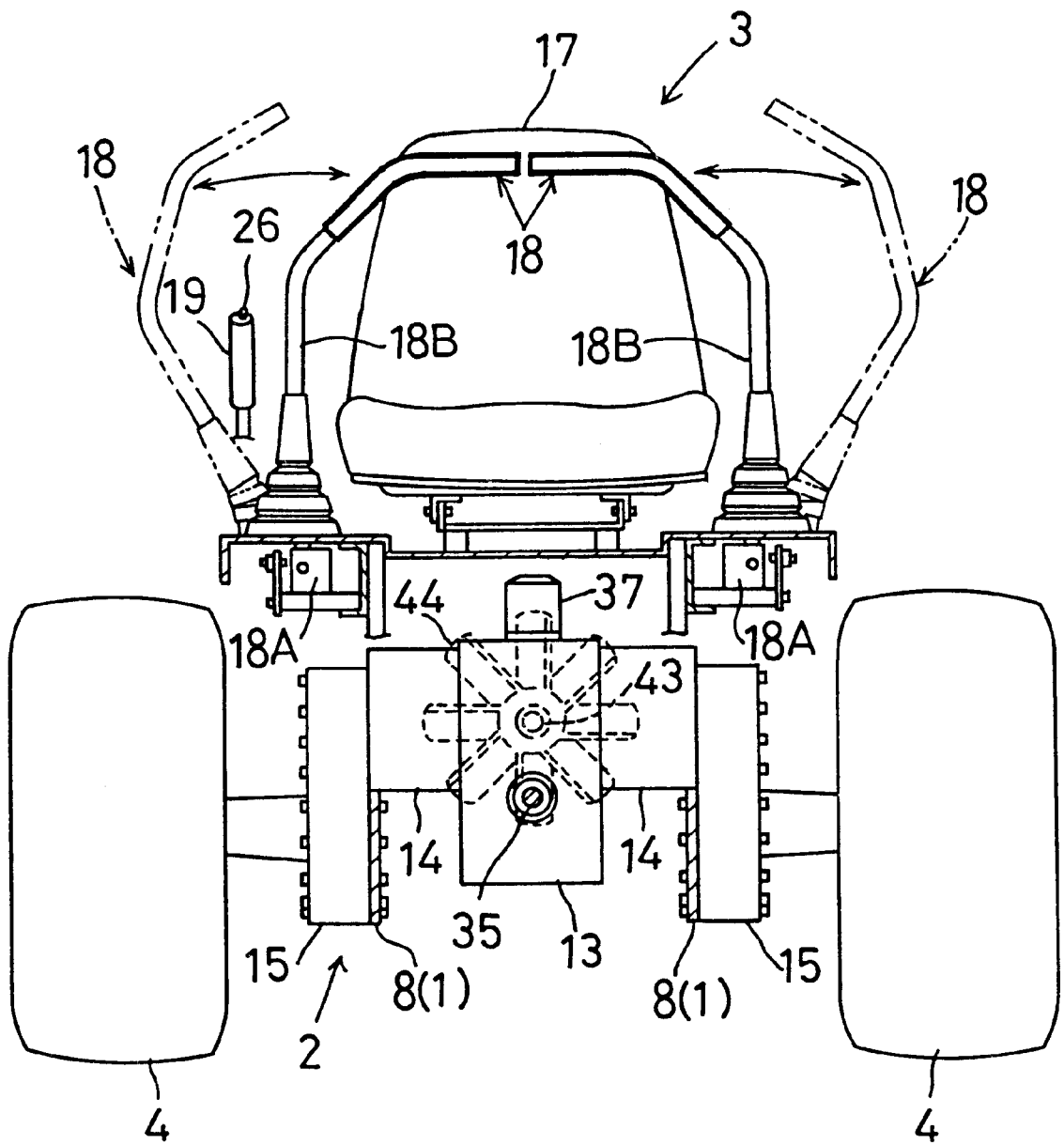
FIG. 3 is a front view in vertical section of the riding mower.
Figure 4:
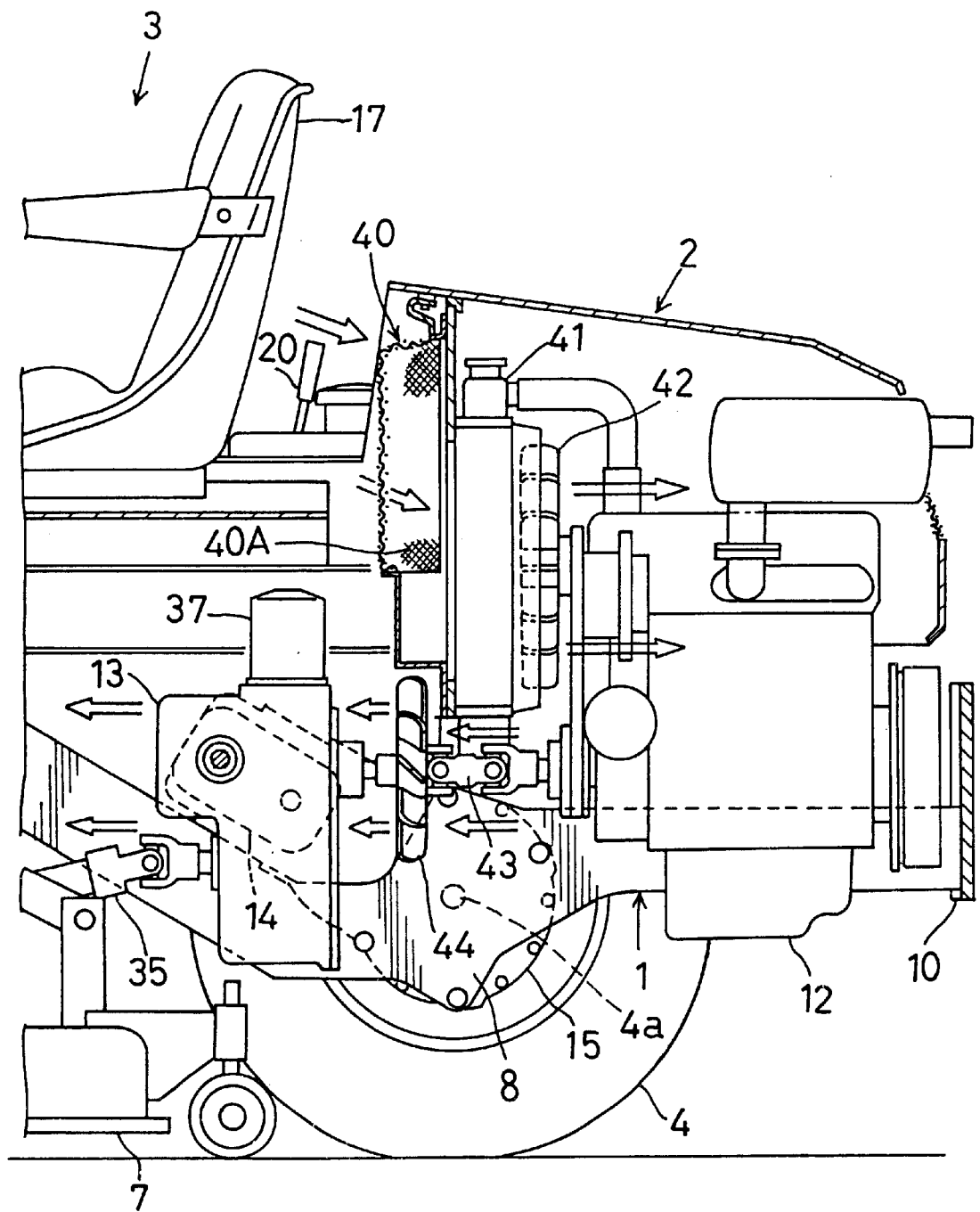
FIG. 4 is a side view in vertical section of the rear half of the mower showing a construction of a motor section.

As shown in FIGS. 1, 3 and 4, the driving platform 3 includes footrests 16 arranged on the front frame 9, a driver's seat 17 disposed above the center case 13, a pair of right and left shift levers 18 arranged at opposite sides of driver's seat 17 to be rockable fore and aft, a lift lever 19 disposed outwardly of the right shift lever 18 to be rockable fore and aft, a clutch lever 20 disposed rearwardly of the right shift lever 18 to be rockable fore and aft, and a parking brake lever 21 disposed below the left shift lever 18 to be rockable up and down.

As shown in FIG. 2, the driver's seat 17 is disposed to overlap the center case 13 in plan view.

Figure 6:
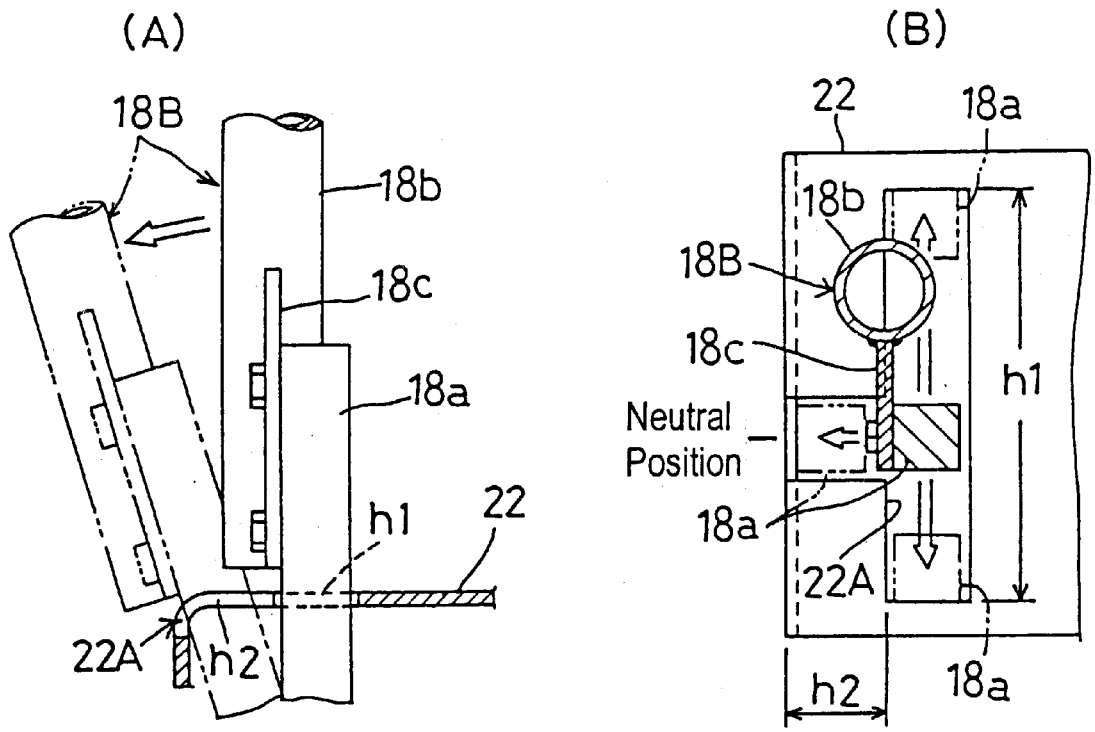
FIG. 6(A) is a fragmentary front view showing a construction of a shift lever.
FIG. 6(B) is a fragmentary cross section showing the construction of the shift lever.
Figure 7:
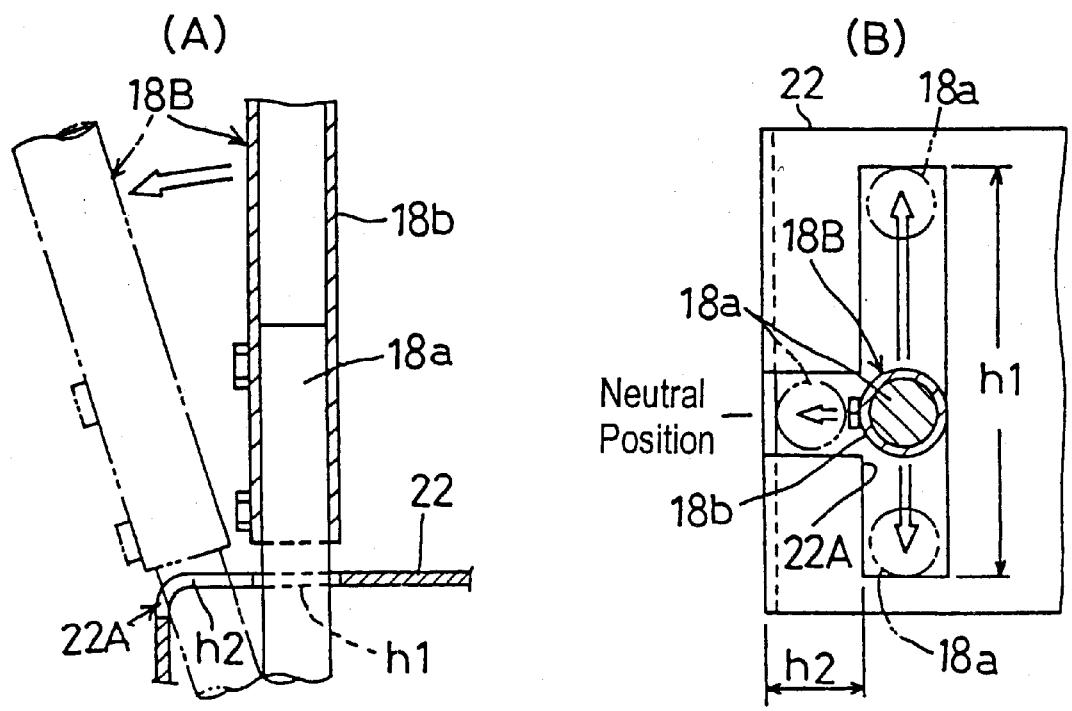
FIG. 7(A) is a fragmentary front view showing a modified construction of the shift lever.
FIG. 7(B) is a fragmentary cross section showing the modified construction of the shift lever.

As shown in FIGS. 3, 6 and 7, each of the right and left shift levers 18 includes a proximal linkage portion 18A interlocked to the corresponding HST 14, and an operating portion 18B extending upward from the linkage portion 18A to be rockable right and left. The operating portion 18B is movable as guided by a guide plate 22. The guide plate 22 defines a T-shaped guide groove 22A including a shifting region h1 for allowing fore and aft rocking of the operating portion 18B, and a retracting region h2 for allowing the operating portion 18B to retract outward from a neutral position in the shifting region h1 corresponding to the neutral state of HST 14. The right and left operating portions 18B are curved so that extreme ends thereof are close to each other when the operating portions 18B are moved to corresponding positions in the shifting region h1.

With this construction, when the driver boards or alights from the mower, the operating portions 18B of the right and left shift levers 18 may be moved from the neutral positions to the retracting regions h2 to secure an open space forwardly of the driver's seat 17. This state also provides an advantage of avoiding a misoperation of one or both of the shift levers 18 from the neutral position, which could occur when part of the driver's body inadvertently contacts the shift lever or levers 18. When driving the mower, with each of the right and left shift levers 18 placed in the neutral position, the operating portion 18B may be rocked forward or backward along the shifting region h1. Then, the right or left propelling wheel 4 may be driven with a driving torque and in a direction of rotation corresponding to an amount of operation of the right or left shift lever 18. Consequently, the mower may be driven in various running states such as a straight forward or backward run, an ordinary turn while running forward or backward, a pivot turn while running forward or backward, and a spin turn. By holding the adjacent extreme ends of the right and left operating portions 18B in one hand, the driver may easily obtain a straight running state which requires the right and left shift levers 18 to be operated by the same amount.

As shown in FIGS. 6(A) and (B), the operating portion 18B may employ a square steel bar as a guided element 18a guided by the guide plate 22, and include a grip 18b in the form of a curved round steel pipe connected to the guided element 18a through a connecting plate 18c. As shown in FIGS. 7(A) and (B), the operating portion 18B may employ a round steel bar as the guided element 18a, and include a grip 18b in the form of a curved round steel pipe fitted on the guided element 18a. The latter has an advantage over the former in simplicity of construction since the connecting plate 18c is dispensed with. In addition, since the guided element 18a and grip 18b are coaxially coupled to each other, a positional adjustment to the neutral position of each shift lever 18 may be made with ease. The latter construction also has an advantage of avoiding a twist of each shift lever 18 in time of operation. Further, the round stick bar employed as the guided element 18a allows each shift lever 18 to move smoothly from the shifting region h1 to the retracting region h2.

Figure 8:
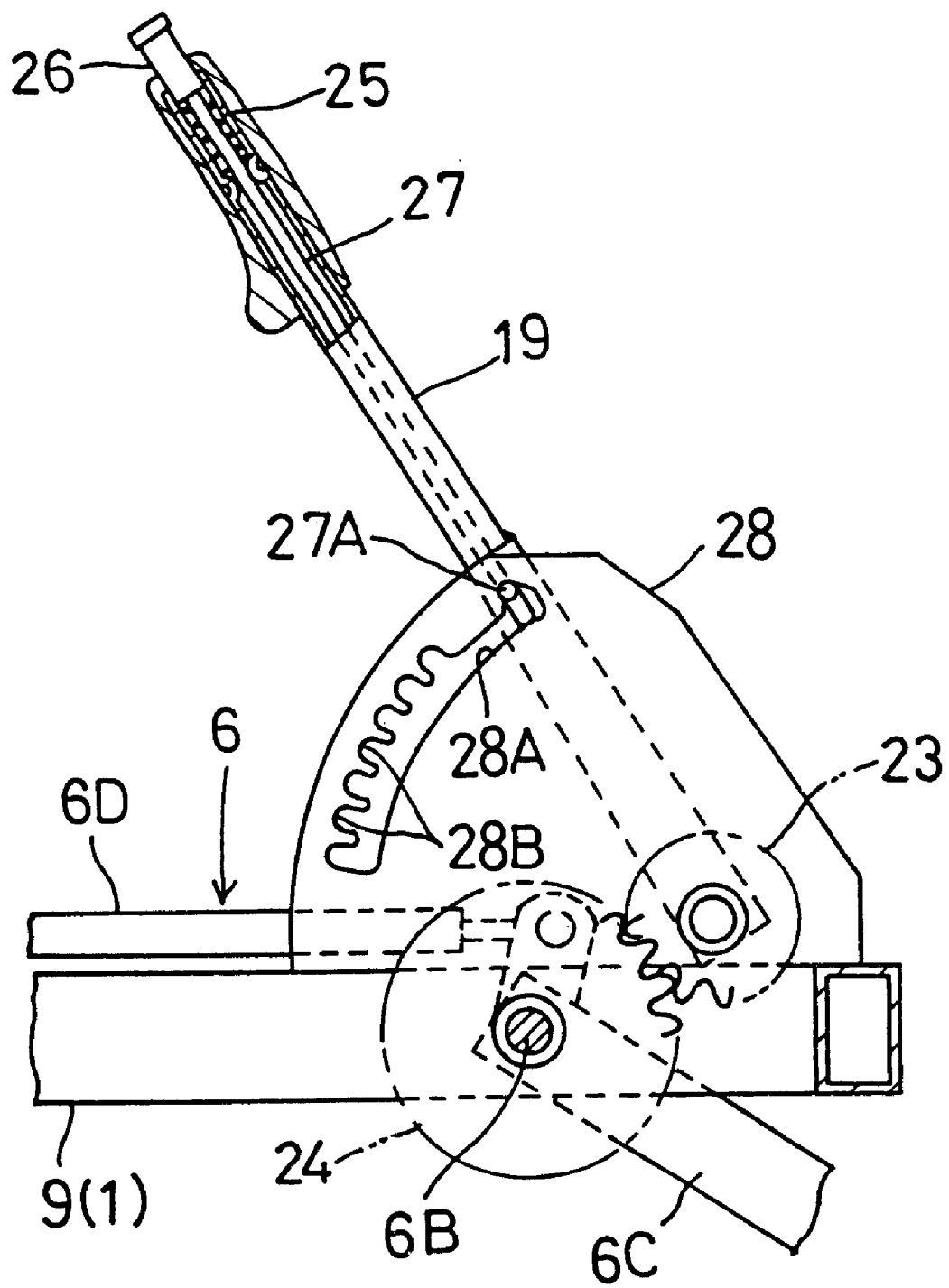
FIG. 8 is a fragmentary side view in vertical section showing a construction of a lift lever.

As shown in FIGS. 1, 2 and 8, the lift lever 19 has a small-diameter gear 23 rotatable with rocking of the lever 19 about a pivotal axis thereof and meshed with a large-diameter gear 24 of the link mechanism 6. The link mechanism 6 has a parallelogram link structure including front links 6A connected for fore and aft pivotal movement to right and left forward positions of the front frame 9 of the body frame 1, a support shaft 6B extending between right and left rear positions of and rotatably supported by the front frame 9, rear links 6C connected to opposite ends of the support shaft 6B to be pivotable with rotation of the support shaft 6B, and interlocking rods 6D for operatively interconnecting the front links 6A and rear links 6C, respectively. The mower unit 7 is pivotally supported by free ends of the links 6A and 6C. The large-diameter gear 24 is mounted on the support shaft 6B to be rotatable therewith.

That is, the lift lever 19 is interlocked to the link mechanism 6 through a servomechanism including the small-diameter gear 23 and large-diameter gear 24. The servomechanism allows the mower unit 7 to be raised and lowered with a relatively small operating force, while being maintained parallel to the body frame 1. To further reduce the operating force required for raising and lowering the mower unit 7, an assisting cylinder or spring may be mounted between the body frame 1 and link mechanism 6 or mower unit 7.

The mower unit 7 is the three blade type having three rotary blades rotatable about vertical axes and arranged sideways in its housing. The mower unit 7 has a gearbox mounted on a center blade shaft for receiving power from a power takeoff shaft 34 projecting from the center case 13.

As shown in FIG. 8, the lift lever 19 includes a control button 26 biased by an internal spring 25 to project from an upper end of the lift lever 19. From the control button 26 extends a rod 27 having an engaging pin 27A provided at a lower end thereof. The pin 27A projects right and left and is displaceable along the lift lever 19 adjacent the proximal end of the latter. When the control button 26 is pressed, the engaging pin 27A is movable under guidance of a guide groove 28A formed in a guide plate 28 erected on the front frame 9. The guide groove 28A is shaped arcuate about the pivotal axis of the lift lever 19. When the control button 26 is released, the engaging pin 27A is movable into one of engaging grooves 28B extending radially of the guide groove 28A, and is maintained therein by the spring 25.

Thus, by pressing the control button 26, the lift lever 19 is operable to raise or lower the mower unit 7 to a selected one of height levels. By releasing the control button 26, the mower unit 7 may be locked to the selected level.

Figure 9:
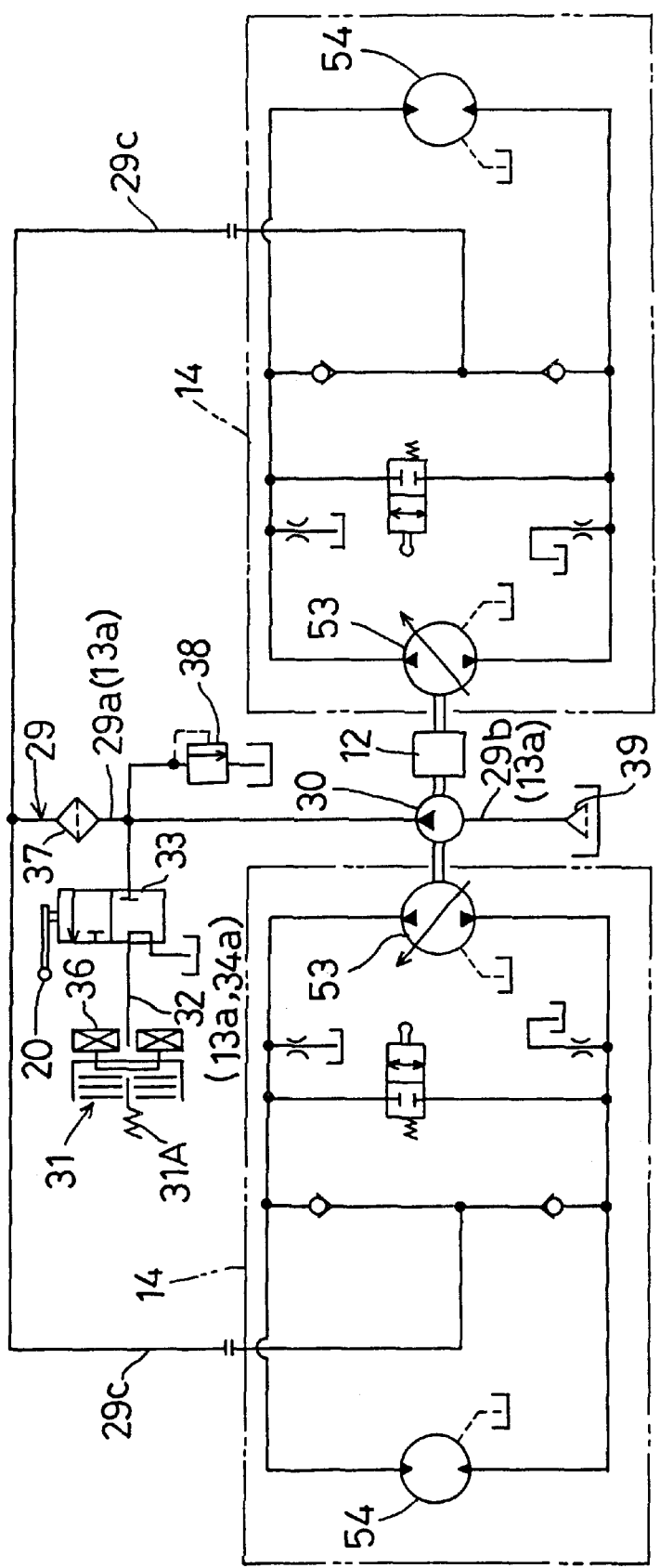
FIG. 9 is a hydraulic circuit diagram showing a construction of hydrostatic stepless transmissions.
Figure 10:
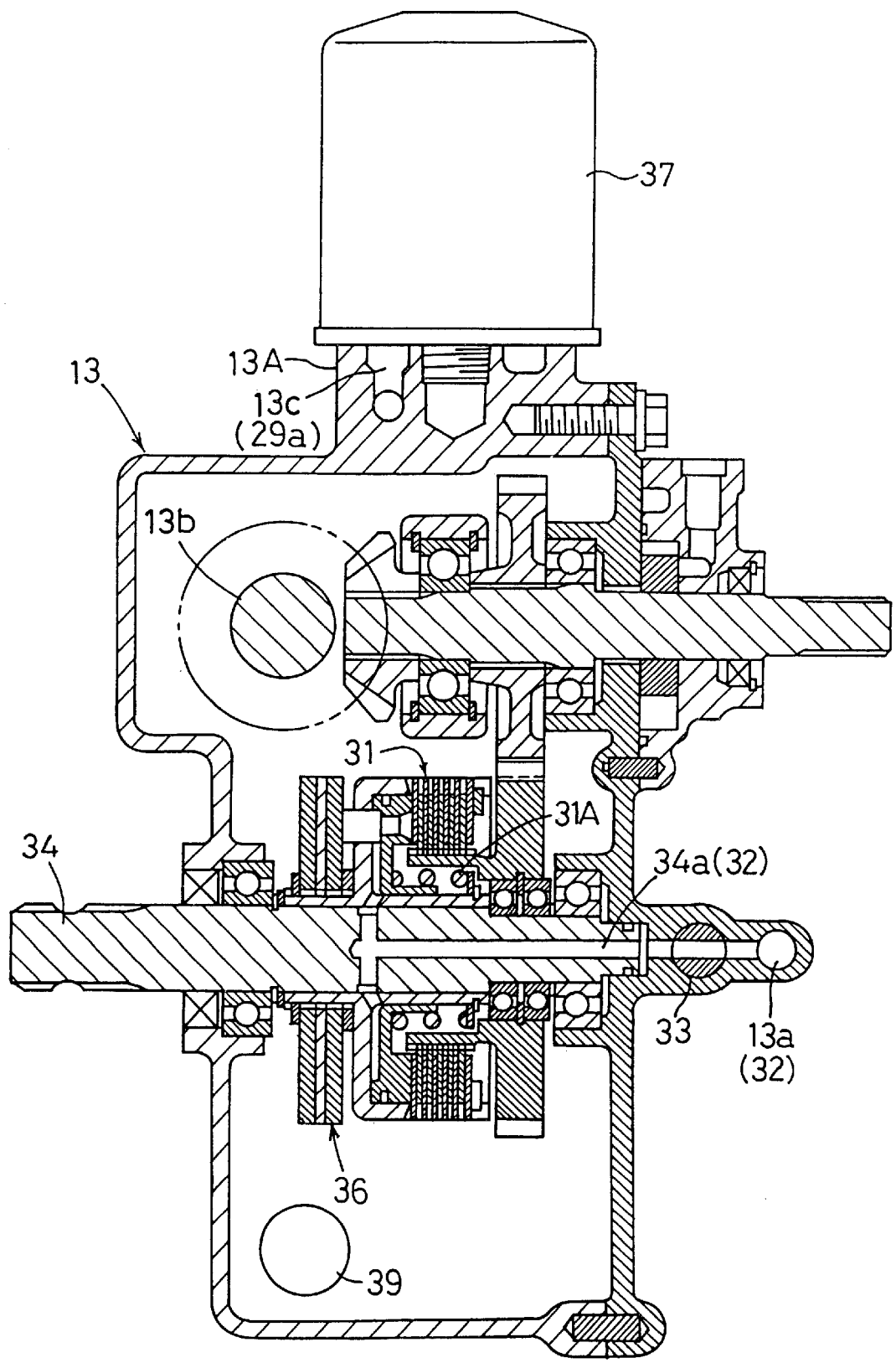
FIG. 10 is a side view in vertical section showing a construction of a power distributor.

As shown in FIGS. 5, 9 and 10, the clutch lever 20 is operable to switch a two-position selector valve 33 mounted on a mower unit driving oil line 32. This oil line 32 extends between a portion 29a, at the delivery side of a charge pump 30, of a charge oil line 29 extending to the right and left HSTs 14, and a hydraulic clutch 31 for making and breaking power transmission to the mower unit 7. The hydraulic clutch 31 is included in the power distributor 13a. When the selector valve 33 is switched to an oil supply position, the clutch 31 is engaged by pressure oil supplied from the charge pump 30, against the biasing force of a clutch disengaging spring 31A. When the selector valve 33 is switched to an oil drain position, the clutch 31 is disengaged, with the pressure oil drained, by the biasing force of spring 31A. As a result, switching is made between a state of transmitting power from the engine 12 to the power takeoff shaft 34 included in the power distributor 13a, and a state of breaking the power transmission to the power takeoff shaft 34. This switches the driving state of the mower unit 7 operatively connected to the power takeoff shaft 34 through a transmission shaft mechanism 35. The hydraulic clutch 31 includes a brake mechanism 36 for braking the power takeoff shaft 34 when the clutch 31 is disengaged by the biasing force of clutch disengaging spring 31A. Thus, the mower unit 7 may be stopped operating as the power transmission to the power takeoff shaft 34 is stopped. Reference B in FIG. 5 denotes brake mechanisms for braking the right and left propelling wheels 4 when the parking brake lever 21 is pulled up.

As shown in FIGS. 9 and 10, the portion 29a, at the delivery side of charge pump 30, of the charge oil line 29 includes a filter 37 mounted thereon and a relief valve 38 connected to that portion 29a. This construction can reduce the suction resistance of charge pump 30, compared with a case of installing the filter 37 on a portion 29b of charge oil line 29 at the suction side of charge pump 30, thereby suppressing cavitation. This provides a proper charge pressure for the right and left HSTs 14, and a proper clutch pressure for the hydraulic clutch 31. Further, compared with a case of connecting relief valves 38 to respective branch oil line portions 29c extending to the right and left HSTs 14 from the portion 29a of charge oil line 29 at the delivery side of charge pump 30, the above construction requires only one relief valve 38, thereby achieving simplicity and low manufacturing cost.

Variable displacement pumps 53 of HSTs 14 and the charge pump 30 are driven by the power from the engine 12. The portion 29a of charge oil line 29 at the delivery side of charge pump 30, the portion 29b of charge oil line 29 at the suction side of charge pump 30, and the mower unit driving oil line 32, are in the form of inner oil lines 13c and 34a formed in the casing 13A of power distributor 13a and in the power takeoff shaft 34. This results in a simplified hydraulic piping construction. Reference 39 in FIGS. 9 and 10 denotes strainers. Reference 13b denotes a shaft for transmitting the power from the engine to the right and left HSTs. This shaft has, fixed thereto, a bevel gear shown in a broken line.

Figure 11:
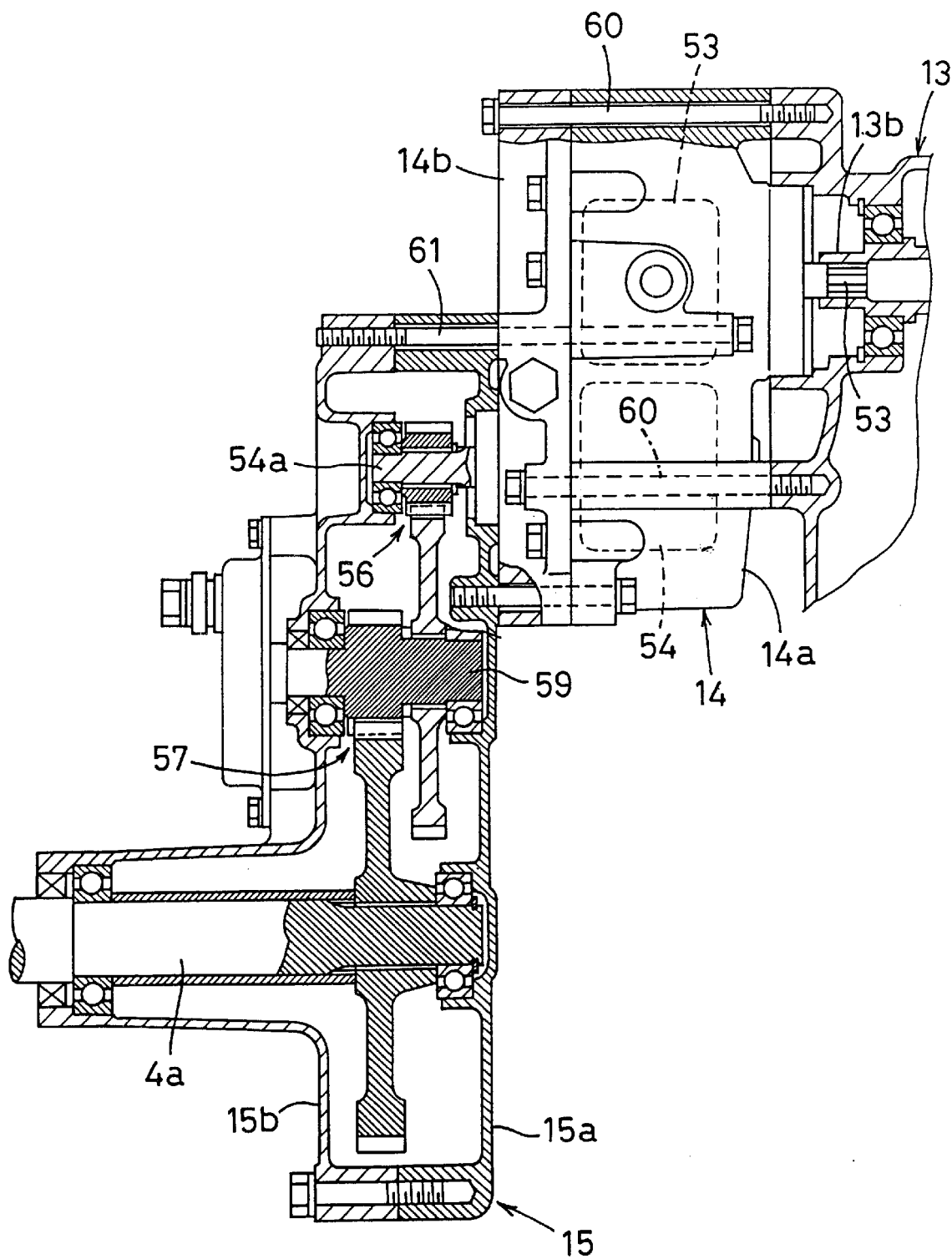
FIG. 11 is a rear view showing a connecting structure of a center case, HST and transmission cases.

As shown in FIG. 11, each HST 14 includes a casing of split construction with an inner case 14a having the hydraulic pump 53 and a hydraulic motor 54, and an oil line block 14b, which are coupled to each other transversely of the mower. A pump shaft 53a is mounted inside and splined to a hollow output shaft 13b of the center case 13. The HSTs 14 are bolted directly to right and left walls of the center case 13.

In the HST 14 disposed on the left side of center case 13, the oil line block 14b corresponds to a "left case", and the inner case 14a to a "right case". In the HST 14 disposed on the right side of center case 13, the inner case 14a corresponds to the "left case", and the oil line block 14b to the "left case".

As shown in FIG. 11, each transmission case 15 has a split construction with an inner case portion 15a and an outer case portion 15b. The transmission case 15 houses spur gear mechanisms 55 and 57 arranged in two stages for transmitting power from a motor shaft 54a acting as an output shaft of HST 14, at a reduced rate to the rear axle 4a. The two spur gear mechanisms 55 and 57 are interlocked through an intermediate shaft 59 having a portion thereof projecting from the transmission case 15. This projecting shaft portion supports an internal expanding brake B used chiefly as a parking brake. The transmission cases 15 are bolted directly to side walls of HSTs 53s a result, the five components, i.e. transmission cases 15, HSTs 14 and center case 13 are integrated to act also as a solid member for supporting the right and left propelling wheels 4.

In the transmission case 15 disposed leftward from the center case 13, the outer case portion 15b corresponds to a "left case", and the inner case portion 15a to a "right case". In the transmission case 15 disposed rightward from the center case 13, the inner case portion 15a corresponds to the "left case", and the outer case portion 15b to the "right case".

As shown in FIG. 11, a plurality of bolts connecting each HST 14 to the center case 13 include a plurality of tightening bolts 60 extending through the inner case 14a, oil line block 14b and center case 13. A plurality of bolts connecting each pair of HST 14 and transmission case 15 include a plurality of tightening bolts 61 extending through the inner and outer case portions 15a and 15b, inner case 14a and oil line block 14b. All these bolts provide increased connecting strength.

As shown in FIGS. 1, 2 and 4, the motor section 2 includes, arranged in order from the driver's seat 17 toward the engine 12, a dust net 40, a radiator 41, and a cooling fan 42 driven by the engine 12. These radiator 41 and cooling fan 42 constitute a radiator mechanism. The radiator mechanism is disposed, in plan view, between engine 12 and center case 13 and overlaps the axles 4a of the propelling wheels 4 in the fore and aft direction. The cooling fan 42 takes in ambient air from adjacent the driver's seat 17 to cool cooling water flowing through the radiator 41, the engine 12, and other components. The ambient air taken in also prevents grass clippings, dust and the like scattered by operation of the mower unit 7, from flowing toward the radiator 41.

As shown in FIGS. 2 through 4, a transmission shaft mechanism 43 for transmitting power from the engine 12 to the power distributor 13a includes an air blowing fan 44 overlapping the right and left HSTs 14 when seen in the fore and aft direction. The fan 44 is rotatable with the transmission shaft mechanism 43 to take in ambient air from a region below and rearwardly of the driver's seat 17, and direct the air toward the right and left HSTs 14 arranged below the driver's seat 17. Thus, the right and left HSTs 14 are cooled efficiently. The ambient air after cooling the intended components, and grass clippings, dust and the like scattered by operation of the mower unit 7, are restrained from flowing toward the driver's seat 17, thereby providing improved working environment for the driving platform 3. This construction also effectively checks clogging of the dust net 40 for preventing the scattering grass clippings, dust and the like from flowing toward the radiator 41. The dust net 40 is box-shaped with vent portions 40A formed on the front, right and left and upper surfaces to provide an increased suction area.

As shown in FIG. 2, the motor section 2 accommodating the engine 12 and its accessories such as the radiator 41 and cooling fan 42 is contained in an outermost turning circle K of the propelling wheels 4. This feature greatly reduces the chance of the motor section 2 contacting other objects when the mower makes a small turn such as a spin turn or a pivot turn by making a speed difference between the right and left propelling wheels 4. Thus, the engine 12, radiator 41 and cooling fan 42 arranged in the motor section 2 are effectively protected from damage. A small turn such as a spin turn or a pivot turn may be performed near another object such as a wall, whereby a grass cutting operation may be carried out with increased facility.

Reference 45 in FIG. 1 denotes fuel tanks arranged laterally of the driver's seat 17 and acting also as fenders.

The right and left front wheels 5 are in the form of casters attached, to be swingable following movement of the mower. That is, the front wheels 5 are steerable by the construction for turning the mower by making a speed difference between the right and left HSTs 14. When an in situ turn is made by driving the right and left propelling wheels 4 at the same speed in opposite directions, the right and left front wheels 5 are turned 90 degrees sideways.

Other embodiments of this invention will be described briefly hereinafter.

Figure 12:
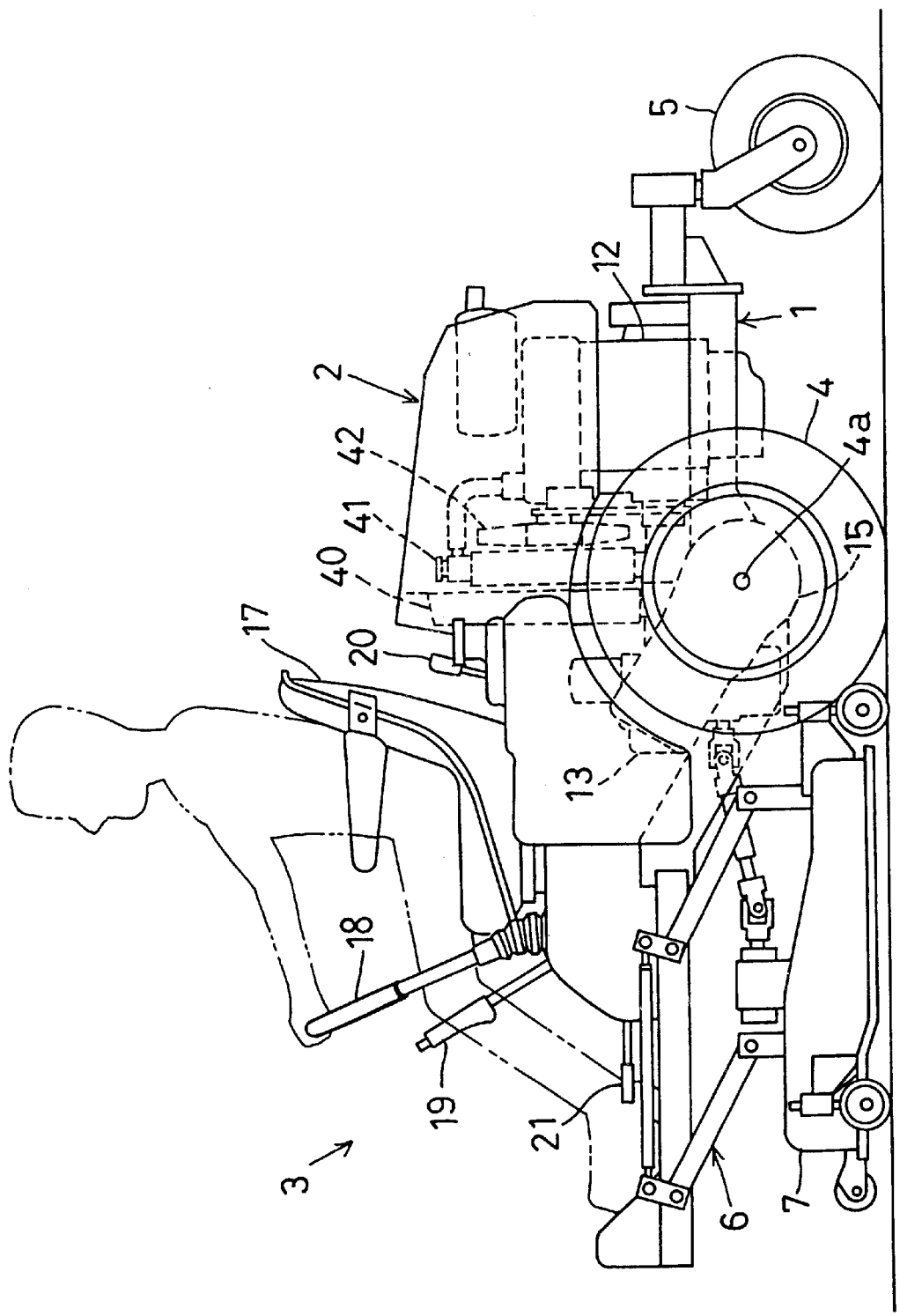
FIG. 12 is a side elevation of a front-mount type riding mower in another embodiment.

As shown in FIG. 12, the riding mower may be the front-mount type with dirigible wheels 5 attached to right and left rear ends of body frame 1, and the mower unit 7 disposed forwardly of right and left propelling wheels 4.

The right and left HSTs 14 may be the belt type.

Figure 13:
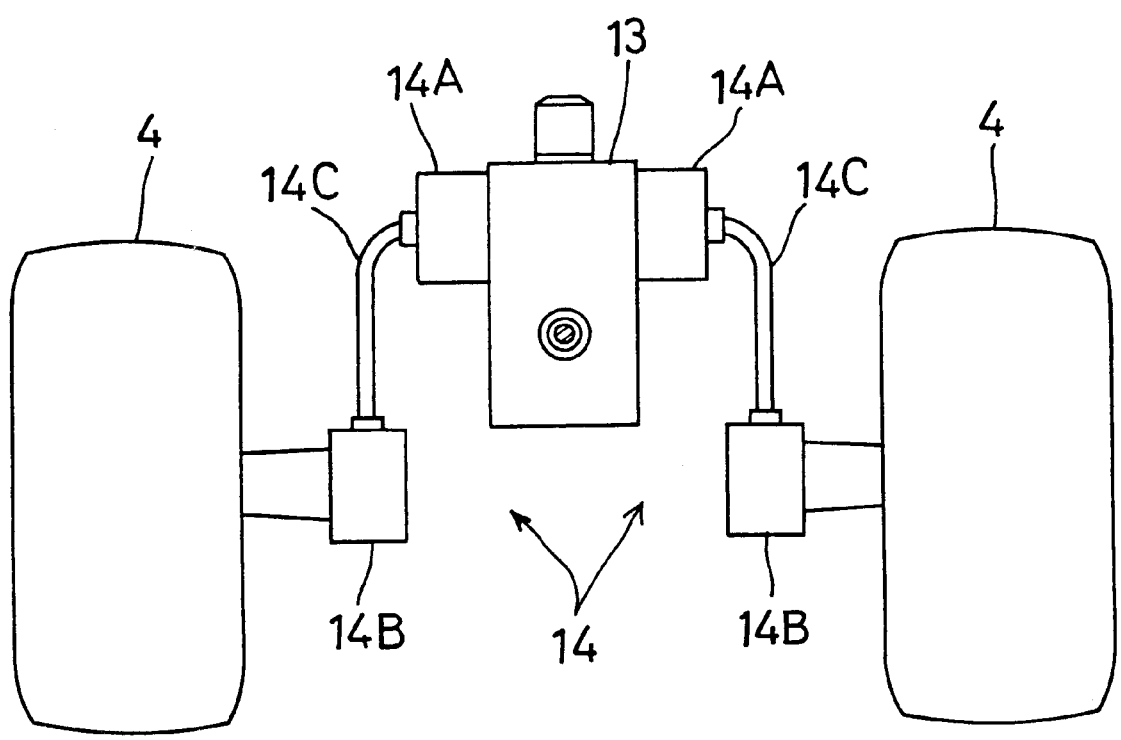
FIG. 13 is a front view in vertical section showing a modified transmission structure.

As shown in FIG. 13, where the right and left HSTs 14 are the hydrostatic type, each variable displacement pump 53 may be connected to the power distributor 13a, and each hydraulic motor 54 to the corresponding propelling wheel 4. The corresponding variable displacement pump 53 and hydraulic motor 54 may be interconnected through a hydraulic hose 14C.

As shown in FIG. 4, two air blowing fans 44 may be provided for the right and left HSTs 14, respectively, and located adjacent the right and left HSTs 14. The air blowing fans 44 may be driven by the transmission shafts 43 through suitable power take-off connectors between the transmission shaft 43 and the air blowing fans 44.

Figure 14:
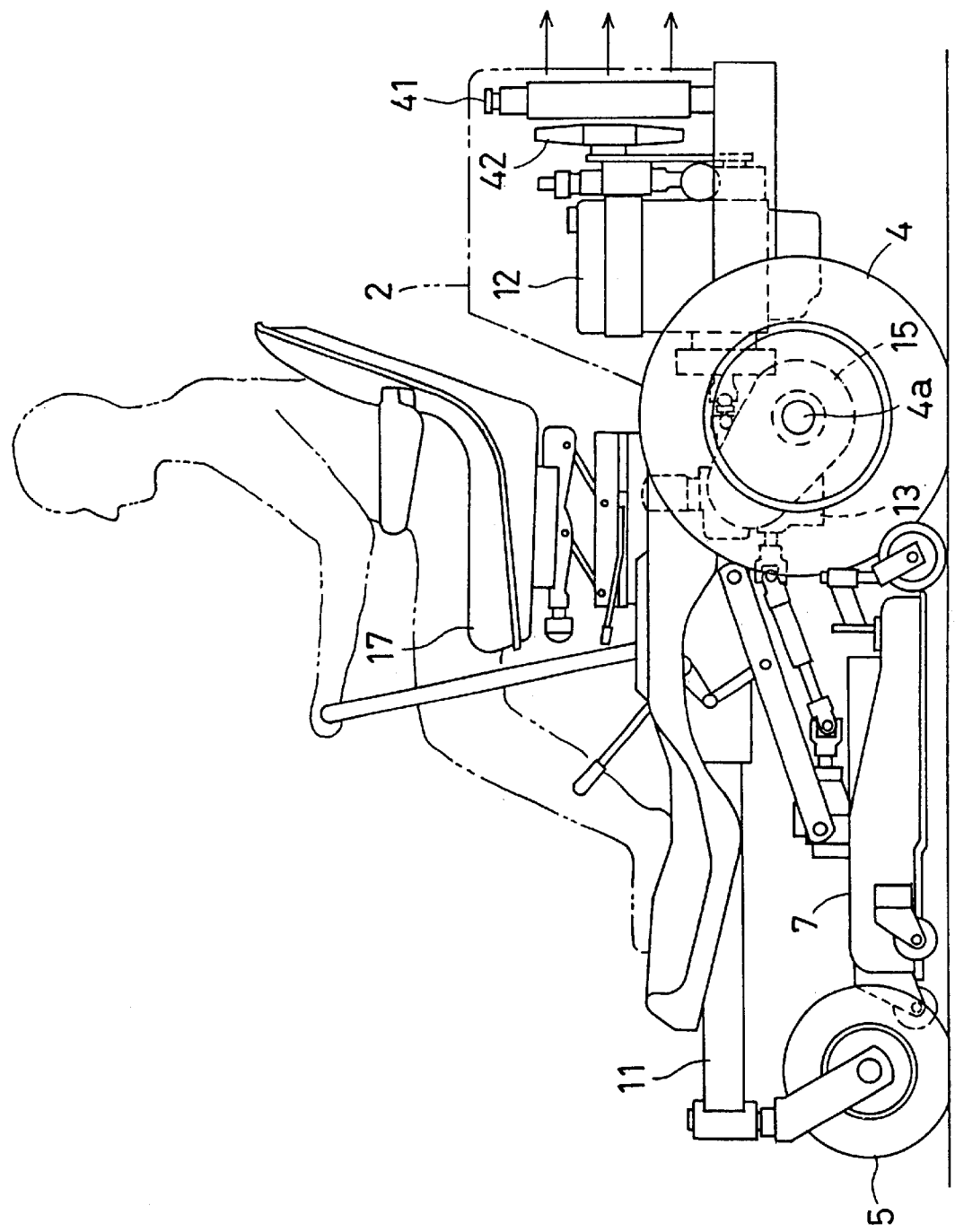
FIG. 14 is a side view of a riding mower in a further embodiment of this invention.

FIG. 14 shows a riding mower in a further embodiment of this invention. As shown in FIG. 14, a motor section 2 may have an engine 12 disposed adjacent the axles of right and left propelling wheels 4, and a cooling fan 42 and a radiator 41 arranged rearwardly of the engine 12. Thus, the center of gravity of the vehicle body is shifted forward to stabilize the weight balance of the vehicle body.

What is claimed is:

1. A riding mower comprising:
   a pair of right and left propelling wheels each having an axle;
   a mower unit disposed forwardly of said axle;
   an engine disposed rearwardly of said axle;
   a center case receiving drive from said engine, said center case being disposed forwardly of said axle so as to define a longitudinal distance between said center case and said engine in a fore and aft direction of the riding mower;
   a pair of right and left hydrostatic transmissions disposed on right and left sides of said center case, respectively, for receiving the engine drive from a drive distributor housed in said center case;
   a pair of right and left side cases receiving the drive from said hydrostatic transmissions, respectively, said side cases being disposed laterally of said hydrostatic transmissions and extending rearwardly therefrom in a fore and aft direction of the riding mower so as to define a transversal distance between said right and left side cases; and
   a radiator mechanism disposed, in plan view, inside a pair of right and left frames extending in said fore and aft direction of the riding mower, wherein said center case and said engine are disposed inside said frames and said right and left side cases are disposed laterally and outside of said frames.

2. A riding mower as defined in claim 1, wherein said engine extends forward past a vertical plane passing through a rearward edge of said pair of right and left propelling wheels.

3. A riding mower as defined in claim 1, further comprising a driver's seat disposed in a position overlapping said center case in plan view.

4. A riding mower as defined in claim 1, further comprising a pair of dirigible front wheels arranged forwardly of said mower unit.

5. A riding mower as defined in claim 1, wherein said hydrostatic transmissions are rigidly interconnected together through the center case, respectively.

6. A riding mower as defined in claim 5, wherein each of said pair of right and left hydrostatic transmissions is rigidly connected to a side wall of said center case.

7. A riding mower as defined in claim 1, wherein said engine and said radiator mechanism are contained in an outermost turning circle of said propelling wheels.

8. A riding mower comprising:
   a pair of right and left propelling wheels each having an axle;
   a mower unit disposed forwardly of said axle;
   an engine disposed rearwardly of said axle
   a center case receiving drive from said engine, said center case being disposed forwardly of said axle so as to define a longitudinal distance between said center case and said engine in a fore and aft direction of the riding mower;
   a pair of right and left hydrostatic transmissions disposed on right and left sides of said center case, respectively, for receiving the engine drive from a drive distributor housed in said center case;
   a pair of right and left side cases receiving the drive from said hydrostatic transmissions, respectively, said side cases being disposed laterally of said hydrostatic transmissions and extending rearwardly therefrom in a fore and aft direction of the riding mower so as to define a transversal distance between said right and left side cases; and a radiator mechanism disposed within a space defined by said longitudinal distance, and said transversal distance, further comprising a pair of right and left frames extending in said fore and aft directions of the riding mower, wherein said center case, said radiator mechanism, and said engine are disposed inside said frames.

9. A riding mower as defined in claim 8, wherein said hydrostatic transmissions are rigidly interconnected together through the center case, respectively.

10. A riding mower as defined in claim 9, wherein each of said pair of right and left hydrostatic transmissions is rigidly connected to a side wall of said center case.

11. A riding mower as defined in claim 8, wherein said engine extends forward past a vertical plane passing through a rearward edge of said pair of right and left propelling wheels.

12. A riding mower as defined in claim 8, further comprising a driver's seat disposed in a position overlapping said center case in plan view.

13. A riding mower as defined in claim 8, further comprising a pair of dirigible front wheels arranged forwardly of said mower unit.

14. A riding mower as defined in claim 8, wherein said engine and said radiator mechanism are contained in an outermost turning circle of said propelling wheels.

* * * * *

UNITED STATES PATENT AND TRADEMARK OFFICE
CERTIFICATE OF CORRECTION

PATENT NO. : 6,578,656 B2
DATED : June 17, 2003
INVENTOR(S) : Kazuo Samejima et al.

It is certified that error appears in the above-identified patent and that said Letters Patent is hereby corrected as shown below:

Title page,
Item [*] Notice, before "Subject" insert as a separate paragraph -- This patent issued on a continued prosecution application filed under 37 CFR 1.53(d), and is subject to the twenty year patent term provisions of 35 U.S.C. 154(a)(2). --.

Column 7,
Line 47, delete "The right and left HSTs 14 may be the belt type. --.

Column 8,
Line 54, "axle" should read -- axle; --.

Signed and Sealed this

Eleventh Day of November, 2003

JAMES E. ROGAN
*Director of the United States Patent and Trademark Office*